(12) United States Patent
Wouhaybi et al.

(10) Patent No.: US 12,267,389 B2
(45) Date of Patent: Apr. 1, 2025

(54) METHODS AND APPARATUS TO DYNAMICALLY CONTROL DEVICES BASED ON DISTRIBUTED DATA

(71) Applicant: Intel Corporation, Santa Clara, CA (US)

(72) Inventors: Rita Wouhaybi, Portland, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/742,268

(22) Filed: May 11, 2022

(65) Prior Publication Data
US 2022/0353328 A1 Nov. 3, 2022

Related U.S. Application Data

(63) Continuation of application No. 15/938,713, filed on Mar. 28, 2018, now Pat. No. 11,356,315.

(51) Int. Cl.
*H04L 67/1087* (2022.01)
*H04L 67/104* (2022.01)
(Continued)

(52) U.S. Cl.
CPC ........ *H04L 67/1093* (2013.01); *H04L 67/104* (2013.01); *H04L 67/1063* (2013.01);
(Continued)

(58) Field of Classification Search
CPC .............. H04L 67/1093; H04L 67/104; H04L 67/1063; H04L 67/1078; H04L 67/12; H04W 4/38
(Continued)

(56) References Cited

U.S. PATENT DOCUMENTS 6,460,082 B1   10/2002   Lumelsky et al.
6,618,764 B1   9/2003    Shteyn
(Continued)

FOREIGN PATENT DOCUMENTS

EP   1988684      11/2008
WO   2016151539   9/2016
(Continued)

OTHER PUBLICATIONS

European Patent Office, "Extended Search Report", issued in connection with European patent application No. 19159539.6 dated Aug. 1, 2019, 7 pages.
(Continued)

*Primary Examiner* — Clayton R Williams
(74) *Attorney, Agent, or Firm* — Hanley, Flight & Zimmerman, LLC

(57) ABSTRACT

Methods, apparatus, systems and articles of manufacture to dynamically control devices based on distributed data are disclosed. An example apparatus includes a comparator to compare a first measurement measured by a first peer device to a second measurement, the second measurement being measured locally by the apparatus; and an operation adjuster to, when the comparison satisfies a threshold, adjust a measurement protocol of the first peer device.

24 Claims, 10 Drawing Sheets

(51) Int. Cl.
  *H04L 67/1061* (2022.01)
  *H04L 67/1074* (2022.01)
  *H04L 67/12* (2022.01)
  *H04W 4/38* (2018.01)
  *H04W 4/70* (2018.01)

(52) U.S. Cl.
  CPC .......... *H04L 67/1078* (2013.01); *H04L 67/12* (2013.01); *H04W 4/38* (2018.02); *H04W 4/70* (2018.02)

(58) Field of Classification Search
  USPC ........................................................ 709/202
  See application file for complete search history.

(56) References Cited

U.S. PATENT DOCUMENTS

| | | | |
|---|---|---|---|
| 6,859,831 | B1 | 2/2005 | Gelvin et al. |
| 6,916,247 | B2 | 7/2005 | Gatto et al. |
| 7,020,701 | B1 | 3/2006 | Gelvin et al. |
| 7,039,701 | B2 | 5/2006 | Wesley |
| 7,069,317 | B1 | 6/2006 | Colrain et al. |
| 7,143,139 | B2 | 11/2006 | Burbeck et al. |
| 7,167,920 | B2 | 1/2007 | Traversat et al. |
| 7,206,934 | B2 | 4/2007 | Pabla et al. |
| 7,797,367 | B1 | 9/2010 | Gelvin et al. |
| 7,844,687 | B1 | 11/2010 | Gelvin et al. |
| 8,140,658 | B1 | 3/2012 | Gelvin et al. |
| 8,177,957 | B2 | 5/2012 | Martin |
| 8,194,573 | B1* | 6/2012 | Smith ..................... H04L 67/12 370/255 |
| 8,656,189 | B2 | 2/2014 | Orsini et al. |
| 8,855,830 | B2 | 10/2014 | Imes et al. |
| 8,965,333 | B1 | 2/2015 | Shreiber et al. |
| 9,686,136 | B1 | 6/2017 | Dey et al. |
| 9,916,636 | B2 | 3/2018 | Li et al. |
| 10,110,495 | B1 | 10/2018 | Sabella et al. |
| 10,277,677 | B2 | 4/2019 | Nachimuthu et al. |
| 10,348,574 | B2 | 7/2019 | Kulkarni et al. |
| 10,440,096 | B2 | 10/2019 | Sabella et al. |
| 11,356,315 | B2 | 6/2022 | Wouhaybi et al. |
| 2002/0005838 | A1 | 1/2002 | Inoue et al. |
| 2002/0143819 | A1 | 10/2002 | Han et al. |
| 2003/0084156 | A1 | 5/2003 | Graupner et al. |
| 2003/0229900 | A1 | 12/2003 | Reisman |
| 2005/0055417 | A1* | 3/2005 | Reich ..................... H04W 64/00 709/208 |
| 2008/0005838 | A1 | 1/2008 | Wan Fong et al. |
| 2009/0037570 | A1* | 2/2009 | Yu ..................... G01D 21/00 709/224 |
| 2009/0122706 | A1 | 5/2009 | Alfano et al. |
| 2011/0092164 | A1 | 4/2011 | Spanhake |
| 2014/0047108 | A1* | 2/2014 | Tse ..................... H04L 41/06 709/224 |
| 2014/0105003 | A1 | 4/2014 | Austin et al. |
| 2016/0367151 | A1 | 12/2016 | Le et al. |
| 2017/0076121 | A1 | 3/2017 | Felch |
| 2017/0085637 | A1* | 3/2017 | Cencini ................. G06F 15/161 |
| 2017/0140570 | A1 | 5/2017 | Leibel et al. |
| 2017/0258338 | A1 | 9/2017 | Presura et al. |
| 2017/0296094 | A1 | 10/2017 | Fonzi, III et al. |
| 2018/0024091 | A1* | 1/2018 | Wang ..................... H04B 1/713 204/431 |
| 2018/0113498 | A1 | 4/2018 | Cronin et al. |
| 2018/0183855 | A1 | 6/2018 | Sabella et al. |
| 2018/0184232 | A1 | 6/2018 | Maitra et al. |
| 2018/0189081 | A1 | 7/2018 | Upasani et al. |
| 2019/0155728 | A1 | 5/2019 | Ferguson et al. |
| 2019/0236562 | A1 | 8/2019 | Padmanabhan |

FOREIGN PATENT DOCUMENTS

| | | | | |
|---|---|---|---|---|
| WO | WO-2018100383 A1 * | 6/2018 | ............. | G05B 15/02 |
| WO | 2018144060 | 8/2018 | | |

OTHER PUBLICATIONS

Larry Lapide, "The Promise and Pitfalls of Big Data," InSIGHTS, Supply Chain Management Review, www.scmr.com, Jul./Aug. 2013, 2 pages.

European Patent Office, "Communication under Rule 71(3) EPC", issued in connection with European Patent Application No. 19159539.6, dated Jun. 7, 2021, (73 pages).

Caraguay et al., "Monitoring and Discovery for Self-Organized Network Management in Virtualized and Software Defined Networks," Sensors, Mar. 31, 2017, vol. 17., [online] available at: www.mdpi.com/journal / sensors (31 pages).

Taherizadeh et al. "Monitoring self-adaptive applications within edge computing frameworks: A state-of-the-art review," The Journal of Systems and Software, Nov. 2, 2017, [online] available at: https://www.researchgate.net/publication/320804254_Monitoring_self-adapti- ve_applications_within_edge_computing_frameworks_A_state-of-the-art_review- . (21 pages).

"NVIDIA Jetson Xavier System-on-Module: Volta GPU + Carmel CPU + 16GB LPDDR4x + 32 GB eMMC," NVIDIA, Jul. 6, 2018. (71 pages).

Lomet et al., "Multi-Version Concurrency via Timestamp Range Conflict Management," Microsoft Research, 2012. (12 pages).

Wikipedia, "Cross-correlation," accessed Jan. 26, 2022, [online] available at: https://en.wikipedia.org/wiki/Cross-correlation. (11 pages).

European Patent Office, "Decision to grant a European patent pursuant to Article 97(1) EPC", issued in connection with European Patent Application No. 19159539.6, dated Oct. 14, 2021, (2 pages).

United States Patent and Trademark Office "Final Office Action" issued in U.S. Appl. No. 15/938,713, on Jul. 21, 2021, 40 pages.

United States Patent and Trademark Office "Final Office Action" issued in U.S. Appl. No. 15/938,713, on Jul. 9, 2020, 39 pages.

United States Patent and Trademark Office "Non-Final Office Action" issued in U.S. Appl. No. 15/938,713, on Feb. 4, 2021, 40 pages.

United States Patent and Trademark Office "Non-Final Office Action" issued in U.S. Appl. No. 15/938,713, on Dec. 27, 2019, 36 pages.

United States Patent and Trademark Office "Notice of Allowance" issued in U.S. Appl. No. 15/938,713, on Feb. 9, 2022, 3 pages.

United States Patent and Trademark Office "Non-Final Office Action" issued in U.S. Appl. No. 15/938,713, on Jan. 28, 2022, 8 pages.

* cited by examiner

METHODS AND APPARATUS TO DYNAMICALLY CONTROL DEVICES BASED ON DISTRIBUTED DATA

RELATED APPLICATION

This patent arises from a continuation of U.S. patent application Ser. No. 15/938,713, (now U.S. Pat. No. 11,356,315) which was filed on Mar. 28, 2018. U.S. patent application Ser. No. 15/938,713 is hereby incorporated herein by reference in its entirety. Priority to U.S. patent application Ser. No. 15/938,713 is hereby claimed.

FIELD OF THE DISCLOSURE

This disclosure relates generally to distributed environments, and, more particularly, to methods and apparatus to dynamically control devices based on distributed data.

BACKGROUND

In recent years, the advances in technology have decreased the prices of sensing devices (e.g., sensors) in an Internet of Things (IoT) environments. IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

IoT environment designers can afford to deploy a large number of sensors in one or more locations to obtain more granular data corresponding to the one or more locations. For example, an IoT environment may include hundreds wireless temperature sensors to measure temperature at different locations in a server room. In such an example, each sensor measures the temperature and wirelessly transmits data corresponding to the temperature to a gateway (e.g., directly or indirectly, by routing the measured data via other sensors in the environment). The gateway may transmit the measured temperature data from all of the sensors in the environment to an off-site aggregator on the cloud via a network. The off-site aggregator processes the temperature data to monitor the temperature throughout the server room. For example, the off-site aggressor may generate a heat map, trigger actions based on the measured data, etc. As the IoT environment designers deploy more sensors, more data is provided to the aggregator for processing.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
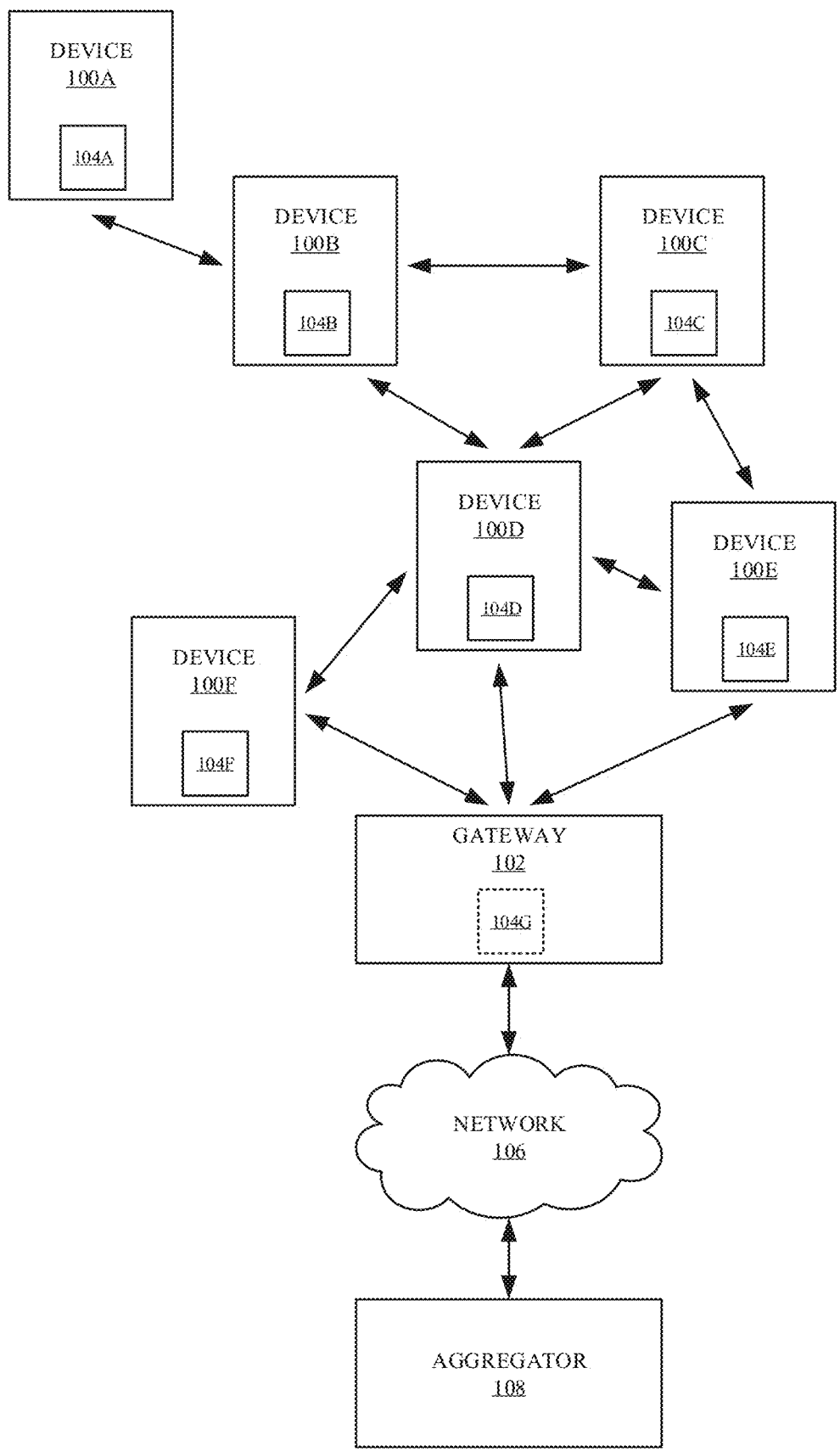
FIG. 1 is an example illustration of a distributed network of example devices.

The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements.

When devices, such as sensors, are deployed in an IoT environment to measure data, the measured (e.g., sampled or sensed) data may be sent to a cloud-based processer (e.g., an aggregator) to aggregate the measured data from the plurality of sensors. The aggregator processes the measured data to provide a user will details of the IoT environment, set flags based on the measured data, etc. For example, a plurality of pressure sensors may be deployed in a pipe system to measure water pressure throughout the system.

The pressure sensors transmit the measured pressure data (e.g., directly or indirectly) to the aggregator to monitor the pressure throughout the pipe system. In some examples, the sensors in an environment may route their data to the aggregator via other sensor and/or a gateway. Accordingly, sensors may be continuously receiving measured data from other sensors and forwarding the data to the aggregator.

In traditional IoT environments, when a deployed sensor receives measured data from a neighboring sensor, the deployed sensor may discard the measured data or forward the measured data to a predetermined device without locally processing the measure data. As the price of sensors decrease, IoT environment developers may deploy large number (e.g., hundreds, thousands, etc.) of sensors to provide more granular data to the aggregator. Accordingly, such traditional IoT environments provides lots of data for the aggregator to process. However, IoT environments that include lots of sensors typically include lots of repetitive data. For example, if two temperature sensors are located near each other, the different between the measurement data of the two sensors may be very small most of the time, thereby providing largely repetitive data for the aggregator to process. Examples disclosed herein decrease the amount of repetitive data that is transmitted to a processor, such as an aggregator, thereby reducing the amount of resources necessary to monitor an IoT environment.

Examples disclosed herein include a system of peer devices (e.g., sensors) that (a) compare locally measured data to measured data of a neighboring device and (b) reduce a sampling frequency/rate and/or a measurement data transmission frequency/rate of one or more devices when the one or more devices are highly correlated (e.g., based on a threshold). For example, if a first device receives measurement data from a second device, the first device compares (e.g., using a cross-correlation function) locally measured data at the first device with the received measurement data measured by the second device. If the comparison result satisfies a threshold (e.g., if the measurement data between the two devices are very similar), the sampling frequency (e.g., the measurement protocol) of the first or the second device is decreased or the measurement data transmission frequency/rate is decreased. For example, the first device may maintain default sampling frequency (e.g., ten measurements per second) while the second device reduces from a ten measurement per second sampling frequency to a one measurement per second sampling frequency. In this manner, the number of measurements transmitted to the aggregator each second is reduced (e.g., from twenty measurements per second to eleven measurements per second). Additionally or alternatively, the second device may maintain the sampling frequency but adjust the measurement data transmission frequency by sending measurement data to other devices less often. The first device continues to compare data from the second device to determine if the correlation between the two devices decreases to readjust the measurement protocol back to the default sampling frequency and/or measurement data transmission frequency, if necessary. Examples disclosed herein reduce the amount of repetitive data being transmitted to an aggregator while maintaining the high granularity of an IoT environment with a large number of sensors. Additionally, examples disclosed herein reduce resource consumption of sensors in a topology of sensors by periodically reducing the sampling frequencies of the sensors.

FIG. 1 illustrates a distributed network (e.g., a device topology) of example devices 100A-100F. FIG. 1 includes the example devices 100A-100F (e.g., peer devices), an example gateway 102, an example topology operation determiner 104, an example network 106, and the example aggregator 108. Although FIG. 1 includes six devices 100A-F and one example gateway 102 defining the device topology, FIG. 1 may include any number of devices and/or gateways located at any location to define a device topology. Additionally, the example gateway 102 may communicate with other gateways in other networks of peer devices.

The example devices 100A-100F of FIG. 1 are sensors that may be deployed to generate a topology of sensors (e.g., a mesh network) to gather data and forward the gathered information to the example gateway 102. For example, the devices 100A-100F may be temperature sensors, audio sensors, vibration sensors, movement/displacement/proximity sensors, velocity sensors, chemical sensors, environment (e.g., weather, moisture, humidity, etc.) sensors, flow sensors, position sensors, light sensors, pressure sensors, force sensors, and/or any other types of devices/sensors/data aggregator/IoT device that can gather (e.g., sense, measure, etc.) data. When a device (e.g., the example device 100A of FIG. 1) samples (e.g., measures or senses) data, the device transmits (E.g., via a Bluetooth, Bluetooth low energy, Wi-Fi, cellular, and/or other network connection) the measured data to the example aggregator 108. In some examples, the measured data is sent after each measurement. In some examples, the device stores the measurement until a threshold number or measurements have been received and then transmits the multiple measurements as a packet of measurement data. The example device 100A may transmit the data to the example aggregator 108 directly or indirectly. For example, the example device 100A may transmit measured data to the example device 100B, which is routed to the example gateway 102 (e.g., via the example device 100B and 100D). In such an example, the gateway 102 transmits the measured data to the example aggregator 108 via the example network 106. In another example, the device 100A may transmit sensed data directly to the example aggregator 108 (e.g., via the example network 106), without the use of the example gateway 102 or other devices.

The example devices 100A-100F of FIG. 1 operate using a measurement protocol which defines the sampling rate of the device and/or a measurement data transmission rate (e.g., how many times per second, minutes, etc. that the device transmits measured data to an external device). For example, a temperature sensor may operate on a measurement protocol that defines ten samples/measurements per second. In some examples, the measurement protocol of one or more of the devices 100A-100F may be updated to increase and/or decrease the sampling/transmission frequency based on the similarity between the measured data of two peer devices (e.g., two of the example devices 100A-100F), thereby minimizing a code function of the network of devices (e.g., reducing the total resources and/or power consumption of the network devices as a whole). Two devices are peer devices when the devices have the same sensory measurement and processing capabilities. For example, end device such as sensors, IoT devices, etc. are peer devices with each other, whereas the example gateway 102 is not a peer of the example devices 100A-100F. In some examples, if the measured data of the example device 100B and device 100C (e.g., peer devices) are very similar (e.g., highly correlated), then the measurement protocol of at least one of the example devices 100B, 100C may be adjusted to decrease the sampling rate and/or decreasing amount of measurement data that the device transmits, thereby reducing device resources and/or decreasing the duplicative of data being received by the example aggregator 108 (e.g., reducing the cost function of the network). Accordingly, when one of the devices 100A-100F receives measured data from another peer device (e.g., directly from the peer device or from a third device), the peer device 100A-100F compares the received measured data to locally measured data to determine if there is a correlation above a match threshold. In this manner, a leader or the correlated devices can adjust one or more of the corresponding measurement protocols to conserve resources. Two or more devices are matched when their correlation to each other is above a match threshold and one or more of the devices are operating using an adjusted measurement protocol. The leader selection and leader operation are further described below. The example devices 100A-100F include example topology operation determiners 104A-104G to compare measurements and adjust measurement protocols. The example topology operation determiners 104A-104G is further described below.

In some examples, because one of the example devices 100A-100F may receive measurement data from a plurality of other peer devices, the receiving device may compare measurement data from more than one peer device and/or with locally measured data. For example, the example device 100F may receive measurement data from the example device 100D. The received measurement data may be data measured by the example device 100D or data from another device, device 100A, for example, that has been forwarded to the example device 100D. In this manner, the example device 100F may perform a comparison of measurement data based on measurement data from the example devices 100A, 100D and/or locally at device 100F. In this manner, the example device 100F can instruct any of the example peer devices 100D, 100A to adjust their measurement protocol (or may adjust the local measurement protocol) based on the comparison of any combination of measurement data from device 100A, 100D and/or 100F (e.g., because device 100A and 100D are highly correlated, device 100A and 100F are highly correlated, device 100D and 100F are highly correlated, and/or the three devices 100A, 100D, and 100F are highly correlated).

In some examples, one or more of the peer device 100A-100F of FIG. 1 may be selected to be a leader. In a non-leader-based topology, when one of the devices 100A-F determines that the received measurement data is highly correlated with local measurement data, the two correlated devices negotiate how to adjust the respective measurement protocols. In a leader-based topology, when one of the devices 100A-100F compares received measurement data with local measurement data, the devices 100A-100F transmit the comparison result to the leader device. In this manner, the leader device is aware of how similar each device in the topology is with each other and can match devices accordingly. The leader device may adjust measurement protocols and transmit the adjusted measurement protocols to the corresponding devices based on the received comparison results. To select a leader, the example devices 100A-100F perform a leader selection protocol to identify a leader protocol based on the capabilities of each of the devices 100A-100F. The leader protocol may correspond to a single leader or a plurality of leaders that are cycled to share the load corresponding to being a leader. In some examples, the gateway 102 is the leader.

Figure 2:
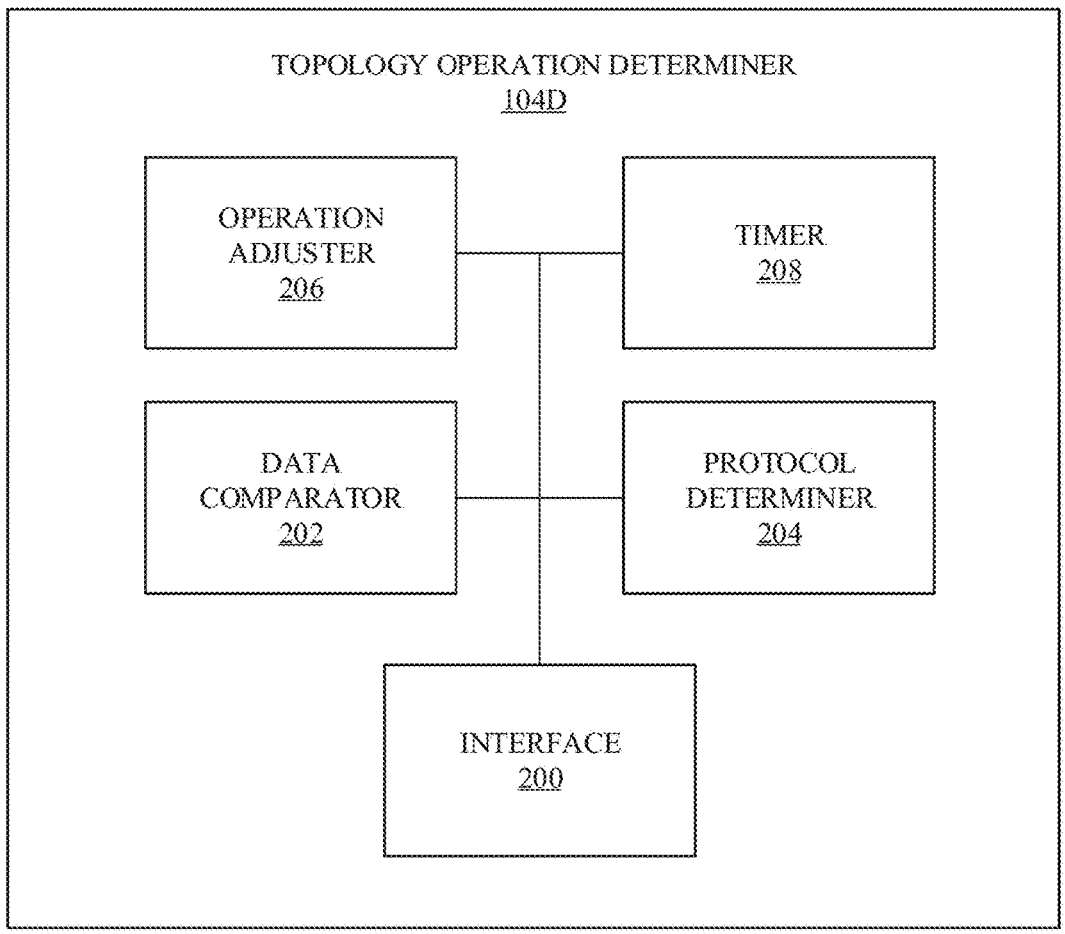
FIG. 2 is a block diagram of an example topology operation determiner of FIG. 1.

The example gateway 102 of FIG. 2 connects the example devices 100A-100F to the network 106. For example, the gateway 102 may gather (e.g., directly or indirectly) the sensed data from the example devices 100A-100F and transmit the gathered data to the example aggregator 108 via the example network 106. Additionally, the example gateway 102 may receive instructions from the aggregator 108 and transmit the instructions to the example device 100A-100F. In some examples, the gateway may include the example topology operation determiner 104G to operate as a leader of the topology.

As an example, the interconnected network of FIG. 1 (e.g., corresponding to the example devices 100A-F and the example gateway 102) may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

The example topology operation determiners 104A-104G of FIG. 1 update operation of the example devices 100A-100F based on the sensed data being transmitted to the example gateway 102. For example, when the example device 100B receives sensed data from another device, the topology operation determiner 104B compares the received data with data that was locally measured at the example device 100B. In some examples, the example device 100B may receive the sensed data from the other device to reroute the sensed data to the gateway 102 (e.g., directly or via another device). The comparison may be a cross-correlation operation, a time delayed cross correlation, and/or any type of probabilistic signal similarity function. The function used for the comparison may be preset and/or may be updated based on instructions from a leader device, the gateway 102, and/or the example aggregator 108. If there is not a dedicated leader in the topology, the topology operation determiner of the device that makes the comparison determines whether the sensed data is correlated to the measured data (e.g., based on a threshold), and may facilitate an update of a measurement protocol (e.g., a decrease or increase of measurement frequency and/or measurement data transmission frequency) at the device 100B and/or the device that sensed the sensed data. If there is a dedicated leader in the topology, the topology operation determiner of the device that makes the comparison transmits the comparison to the leader, and the leader determines how to adjust measurement protocol of one or more devices based on the comparison and/or other comparison that the leader has received from other devices.

In a leader-based topology, any one of the example topology operation determiners 104A-F of the devices 100A-100F and/or the gateway 102 may operate as the leader. In some examples, the topology operation determiners 104A-F develop a leader protocol to rotate the leader responsibilities between one or more of the devices 100A-100F, thereby sharing the leader responsibilities. To operate in a leader-based topology, the example topology operation determiners 104A-G perform a leader selection protocol to determine the leader protocol. The leader selection protocol includes a discovery process to identify all the devices in the topology and a communication protocol to communicate the capabilities of each device 100A-100F. The leader protocol determines which of the devices 100A-100F should operate as the topology leader based on the capabilities of the devices 100A-100F. For example, a leader protocol may define that during a first duration of time, the example device 100C operates as the leader, during a second duration of time, the example device 100D operates as the leader, and during a third duration of time, the second device 100E operates as the leader, where the process repeats. Alternatively, any leader protocol pattern may be developed to share the leader load. When a device is selected as a leader, the example topology operation determiners 104A-F of the example device 100A-F compare sensed data from other devices with measured data (e.g., information obtained locally at the device) and forward the results to the leader. The topology operation determiner of the leader determines how to adjust the measurement protocols of the example devices 100A-F based on the received comparisons. The example topology operation determiner 104D is further described below in conjunction with FIG. 2.

The example network 106 of FIG. 1 is a system of interconnected systems exchanging data. The example network 106 may be implemented using any type of public or private network such as, but not limited to, the Internet, a cloud-based network, a telephone network, a local area network (LAN), a cable network, and/or a wireless network. To enable communication via the network 106, the example devices 100A-F and/or the example gateway 102 include a communication interface that enables a connection to an Ethernet, a digital subscriber line (DSL), a telephone line, a coaxial cable, or any wireless connection, etc.

The example aggregator 108 of FIG. 1 aggregates the sensor data from the example devices 100A-100F. The example aggregator 108 may be a cloud-based device and/or processor that allows a user to view data corresponding to the topology measurements and/or make decisions based on the data gathered by the device topology. In some examples, the aggregator 108 receives leader protocol updates and/or measurement updates so that the aggregator 108 can flag patterns of the topology of devices. For example, if the example device 100D is being selected as leader 80% of the time, the aggregator 108 can flag the leader selection to a user. In this manner, the user can make decisions to increase the efficiency of the topology. For example, the user may deploy more sensors located near the example device 100D, increase the processing power and/or battery power of the device 100D, etc. Additionally, the example aggregator 108 may push updates to the example devices 100A-F via the network 106. The updates may include changes to protocols, changes to comparison functions, topology restrictions, etc. The updates may be based on user preferences and/or previous data aggregations.

The device topology of FIG. 1 may provide opportunities for new technical features, such as those as described herein. The improved technologies and networks may enable the exponential growth of devices and networks, including the use of device topologies into as fog devices or systems. As the use of such improved technologies grows, the device topologies may be developed for self-management, functional evolution, and collaboration, without needing direct human intervention. The improved technologies may even enable device topologies to function without centralized controlled systems. Accordingly, the improved technologies described herein may be used to automate and enhance network management and operation functions far beyond current implementations.

In an example, communications between devices 100A-F may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such device topologies may be further enhanced by the integration of sensing technologies, such as sound, light, electronic traffic, facial and pattern recognition, smell, vibration, into the autonomous organizations among the sensing devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

FIG. 2 is a block diagram of the example topology operation determiner 104D of FIG. 1. Although the example topology operation determiner 104D is described in conjunction with FIG. 2, FIG. 2 may describe any one of the example topology operation determiner 104A-104C, 104E-100G of FIG. 1. The example topology operation determiner 104D includes an example interface 200, an example data comparator 202, an example protocol determiner 204, an example operation adjuster 206, and an example timer 208.

The example interface 200 of FIG. 2 communicates with (e.g., transmits and/or receives data to/from) the other devices 100B-100F, the example gateway 102, and/or the example aggregator 108. For example, interface 200 may receive sensor data from a neighboring device (e.g., the example devices 100B, 100C, 100F, 100E). The interface 200 may receive sensor data that was measured by the example device 100A and has been routed to the interface 200 through the example device 100B. Additionally, the example interface 200 may receive instructions from other devices 100A-100C, 100E-100F, the gateway 102, and/or the aggregator 108 correspond to protocol updates. The interface 200 may transmit comparison result(s) (e.g., made locally or routed comparison from other devices) to neighboring devices. For example, when sensed data from a neighboring device is compared to locally measured data, the interface 200 may transmit the comparison result to the leader. Additionally, the interface 200 may transmit instructions to neighboring devices corresponding to protocol updates. For example, when the device 100D is a leader, the interface 200 may transmit measurement protocol adjustments to the other devices 100A-100C, 100E-100F in the topology.

The example data comparator 202 of FIG. 2 compares sensed/measured data from two or more devices to determine whether the two or more devices are highly correlated (e.g., based on a threshold). In some examples, the data comparator 202 compares locally measured data to received sensed data from a neighboring device. The example data comparator 202 compares the locally measured data with the received sense data based on a comparison function. The comparison function may be a cross correlation, a time-delayed cross correlation, and/or any other probabilistic signal similarity function that measures the similarity between two measurements. In some examples, the comparison function may be adjusted based on user preferences and/or previous measurements. In some examples, the data comparator 202 may only perform data comparisons when the device 100D is a leader. In such examples, each device in the topology transmits the sensed data to the leader and the data comparator 202 compares the sensed data of each device with the other devices to determine if there is a correlation (e.g., more than a threshold correlation) between any of the devices in the topology.

The example protocol determiner 204 of FIG. 2 facilitates (A) received measurement protocol(s) based on comparison results and/or (B) a leader protocol based on a leader selection protocol. The measurement protocol corresponds to how each device 100A-F measures data. For example, when the example device 100D receives a measurement protocol to perform measurements at a certain frequency from another device 100A-100C, 100E-100F, the gateway 102, and/or the aggregator 108, the example protocol determiner 204 ensures that the device 100D measures data according to the frequency. The example protocol determiner 204 determines the leader protocol based on leader selection protocol. The leader protocol corresponds to which device(s) should operate as a leader and when, based on the capabilities of the example devices 100A-F in the topology. For example, a leader protocol may correspond to the example device 100B being the leader for three sampling intervals and the example device 100D being the leader for four sampling intervals, wherein the process is repeated every seven sampling intervals. The leader selection protocol may determine a new leader protocol when an update to the device topology has been received and/or when a threshold amount of time has passed. Any one of the devices 100A-100F may flag an update to the device topology to the leader when one of the devices 100A-100F determines that a new device has entered the topology or an old device has left the topology.

The example operation adjuster 206 of FIG. 2 adjusts the measurement protocol based on a comparison of measured data between two devices. For example, when two devices are highly correlated, the combination of data from the two devices are largely repetitive/duplicative. Accordingly, the operation adjuster 206 may adjust the measurement protocol of one or both of the devices to reduce the measurement frequency and/or measurement data transmission frequency while the devices are highly correlated, thereby conserving resources. When there is a dedicated leader, the operation adjuster 206 of the leader determines what adjustments, if any, to make to a measurement protocol based on the received comparisons from two or more devices. For example, when the device 108D and receives a data comparison (e.g., a correlation) between device 100B and device 100C, the operation adjuster 206 of the device 108D may adjust the measurement protocol of device 100B or the measurement protocol of the device 108C based on the comparison. Additionally, when the leader is one of the devices 100A-F, the operation adjuster 206 may adjust the measurement protocol of itself or anther device when the correlation between the two devices are more than threshold correlation. When there is not a dedicated leader, the operation adjuster 206 of the device that made the comparison determines the measurement protocol adjustments between itself and the device that transmitted the sensed data. For example, when the device 108D receives data from device 108C and there is not a dedicated leader, the operation adjuster 206 of the device 108D may adjust the measurement protocol of itself (e.g., device 108D) or of the device 108C based on a comparison of the sensed data of device 108C and the locally sensed data at device 108D. In some examples, the operation adjuster 206 may return operation from an adjusted measurement protocol (e.g., with a reduced sampling/transmission frequency/rate) back to a default measurement protocol (e.g., with a higher default sampling frequency) when a threshold duration of time has passed. In this manner, devices that have lowered their sampling/transmission frequency return to default in case of an error or a hack in the topology, thereby corresponding to a quality control check to the topology.

The example timer 208 of FIG. 2 tracks a duration of time. For example, the timer 208 may be set to flag, or otherwise note, when one or more durations of time have exceeded. For example, when the default measurement protocol of the device 100D has been adjusted, the timer 208 may track a duration of time to return to the default measurement protocol (e.g., as part of a quality control check). Additionally, the example timer 208 may track the amount of time since a leader selection protocol has been performed. In this manner, the timer 208 may trigger an initiation of a leader selection protocol when a threshold amount of time has passed.

While an example manner of implementing the example topology operation determiner 104D of FIG. 1 is illustrated in FIG. 2, one or more of the elements, processes and/or devices illustrated in FIG. 2 may be combined, divided, re-arranged, omitted, eliminated and/or implemented in any other way. Further, the example interface 200, the example data comparator 202, the example protocol determiner 204, the example operation adjuster 206, the example timer 208, and/or, more generally, the example topology operation determiner 104D of FIG. 2 may be implemented by hardware, software, firmware and/or any combination of hardware, software and/or firmware. Thus, for example, any of the example interface 200, the example data comparator 202, the example protocol determiner 204, the example operation adjuster 206, the example timer 208, and/or, more generally, the example topology operation determiner 104D of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 200, the example data comparator 202, the example protocol determiner 204, the example operation adjuster 206, the example timer 208, and/or, more generally, the example topology operation determiner 104D of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example topology operation determiner 104D of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions for implementing the topology operation determiner 104D of FIG. 2 are shown in FIGS. 3-8. The machine readable instructions may be a program or portion of a program for execution by a processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 3-8, many other methods of implementing the example topology operation determiner 104D may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 3:
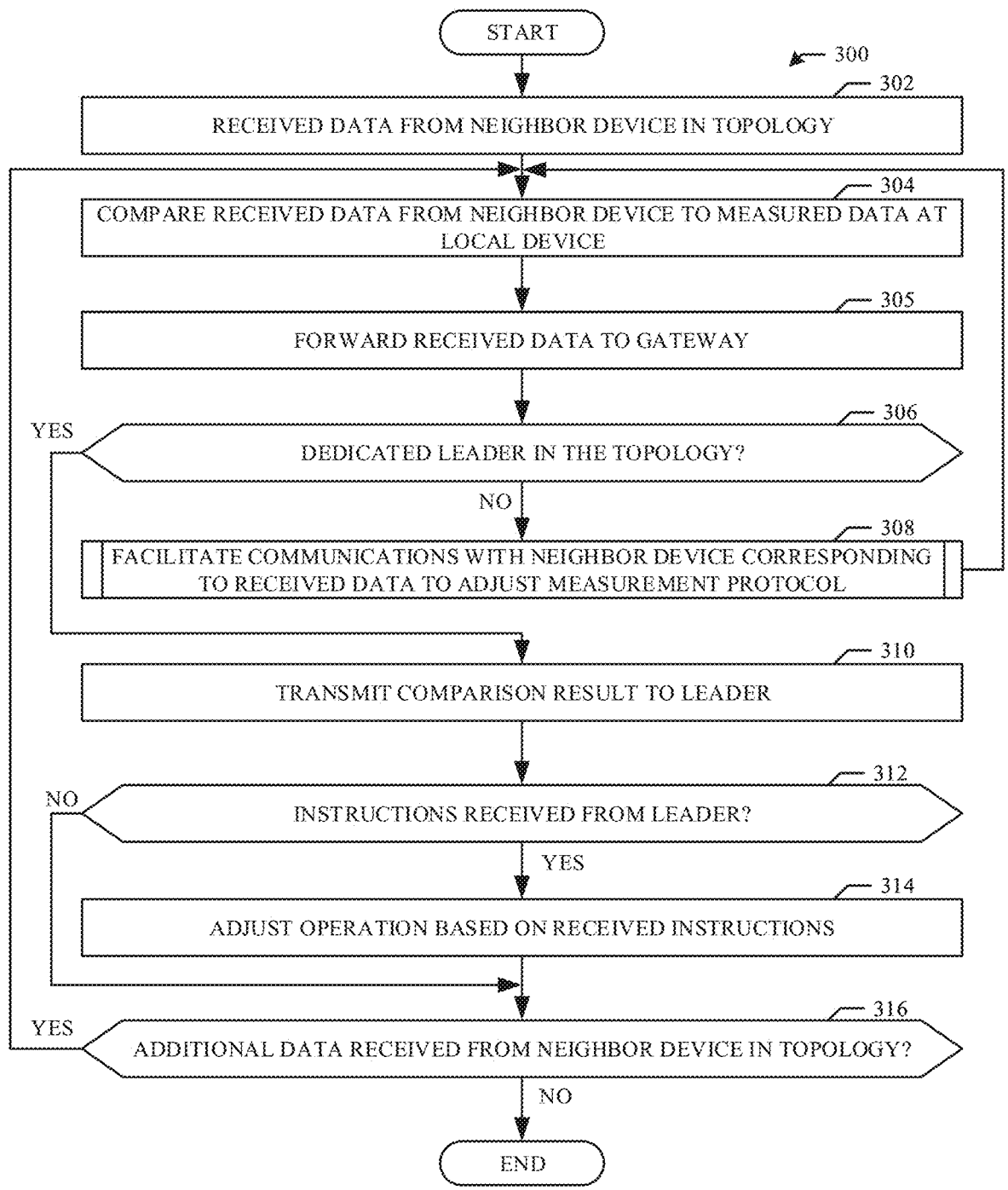
FIGS. 3-8 are flowcharts representative of machine readable instructions which may be executed to implement the example topology operation determiner of FIGS. 1-2.

FIG. 3 is an example flowchart 300 representative of example machine readable instructions that may be executed by the example topology operation determiner 104D of FIG. 2 to dynamically control devices based on distributed data. The instructions of FIG. 3 correspond to when the device 100D is not a leader. Although the instructions of flowchart 300 are described in conjunction with the example topology operation determiner 104D of the device 100D, the instructions may be executed by any of the topology operation determiners 104A-F of any of the devices 100A-F.

At block 302, the example interface 200 receives data from a neighbor device (e.g., devices 100B-100F). The data corresponds to data sensed/measured/sampled by the neighboring device or routed data sensed by another device. For example, the interface 200 of the example device 100D may receive measurement data that was sensed by the example device 100A and routed to device 100D through device 100B. The data may include information (e.g., metadata) corresponding to where the data was sensed, the current measurement protocol used to sense the data, and/or any other data corresponding to the device or measurement of the device. At block 304, the example data comparator 202 compares the received data from the neighbor device to locally measured data (e.g., data locally measured/sensed by the device 100D). As described above, the example data comparator 202 may compare the data based on a cross-correlation function, a delayed cross-correlation function, and/or any other probabilistic signal similarity function. At block 305, the example interface 200 forwards the received data to the example gateway 102 (e.g. directly or via another device 100A-F).

At block 306, the example protocol determiner 204 determines if there is a dedicated leader in the topology of devices. If the example protocol determiner 204 determines that there is not a dedicated leader (block 306: NO), the topology operation determiner 104D facilitates communications with the neighboring device corresponding to the received data to adjust a measurement protocol (block 308), as further described below in conjunction with FIG. 4. If the example protocol determiner 204 determines that there is a dedicated leader (block 306: YES), the example interface 200 transmits the comparison results to the leader (block 310). The transmitted comparison result may include data corresponding to how the comparison was determined, which devices correspond to the comparison, etc. As described above, the interface 200 may transmit the comparison results directly to the leader or indirectly (e.g., by routing the comparison to the leader via neighbor device(s)).

At block 312, the example interface 200 determines if instructions have been received from the leader. For example, when the interface 200 transmits the comparison results to the leader, the leader may determine that the example device 100D should adjust its measurement protocol based on the comparison and transmit instructions to the example device 100D to adjust its measurement protocol. Additionally or alternatively, the example leader may transmit instructions to adjust the comparison function used for subsequent comparisons. If the example interface 200 determines that instructions have not been received from the leader (block 312: NO), the process continues to block 416. If the example interface 200 determines that the instructions have been received from the leader (block 312: YES), the example operation adjuster 206 adjusts operation of the device 100D based on the received instructions (block 314). For example, if the instructions correspond to adjusting the measurement protocol, the example operation adjuster 206 instructs the device 100D to adjust its measurement protocol based on the instructions. If the instructions correspond to a different comparison function, the example operation adjuster 206 instructions the example data comparator 202 to adjust its measurement protocol based on the updated comparison function.

At block 316, the example interface 200 determines if additional data has been received from a neighbor device in the topology (e.g., the example devices 100A-100C, 100E-100F). If the example interface 200 determines that additional data has not been received form a neighbor device in the topology (block 316: NO), the process returns to block 312 until instructions have been received and/or additional data has been received. If the example interface 200 determines that additional data has been received form a neighbor device in the topology (block 316: YES), the process returns to block 304 to perform a subsequent comparison based on the newly received data.

Figure 4:
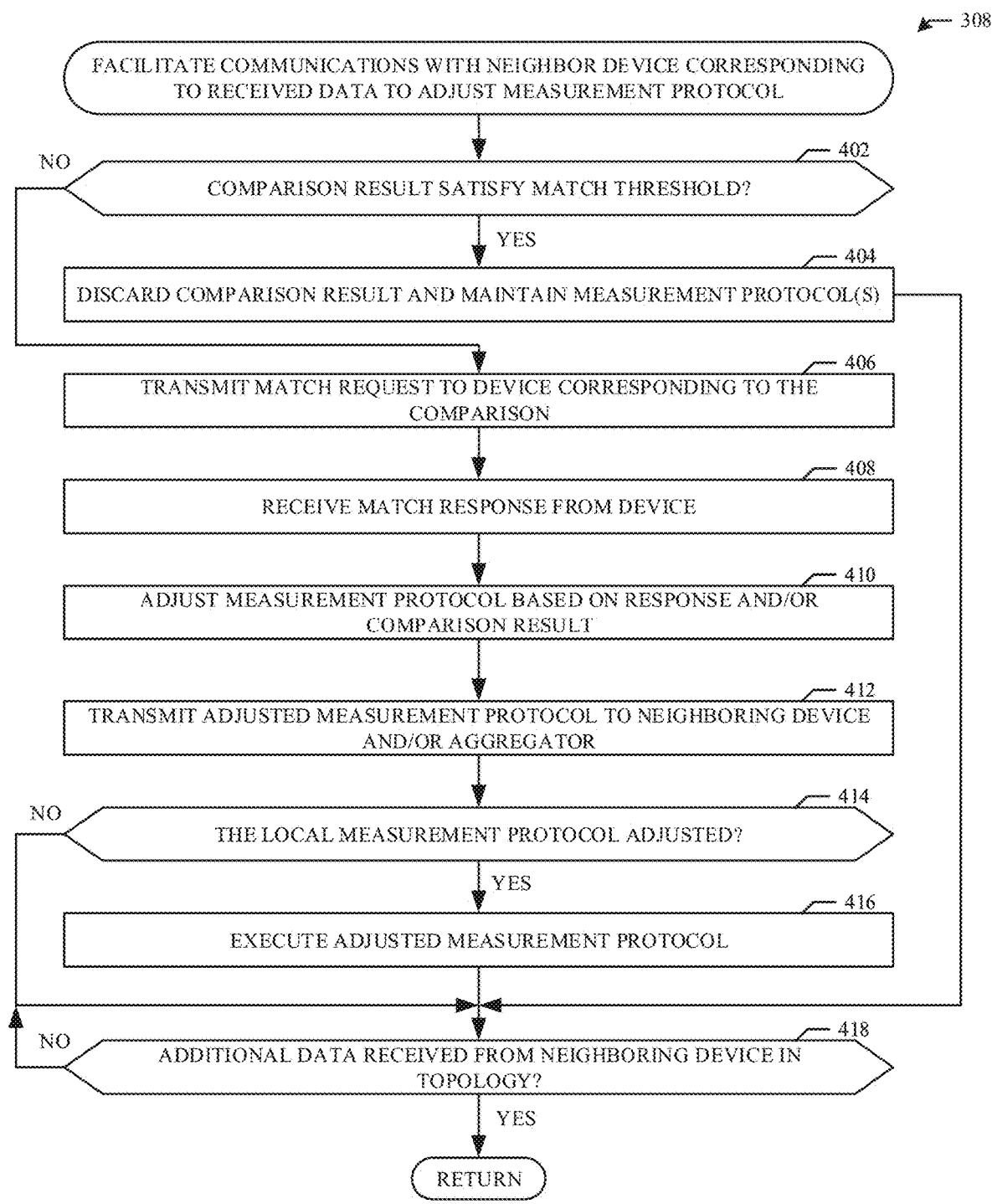

FIG. 4 is an example flowchart 308 representative of example machine readable instructions that may be executed by the example topology operation determiner 104D of FIG. 2 to facilitate communications with neighboring device corresponding to received data to adjust a measurement protocol, as described above in conjunction with block 308 of FIG. 3. The instructions of FIG. 4 correspond to when the device 100D is not a leader and the device 100D is not already matched with another device in the topology. Although the instructions of flowchart 308 are described in conjunction with the example topology operation determiner 104D of the device 100D, the instructions may be executed by any of the topology operation determiners 104A-F of any of the devices 100A-F.

At block 402, the example data comparator 202 determines if the comparison result satisfies a match threshold. For example, if the comparison result is based on a cross-correlation and the match threshold is 85%, then the data comparator 202 determines that the comparison results satisfies the match threshold when the comparison result is above 85%. The match threshold may be preset and/or adjustable based on instructions from the leader, the gateway 102, and/or the aggregator 108.

If the example data comparator 202 determines that the comparison results does not satisfy the match threshold (block 402: NO), the example operation adjuster 206 discards the comparison result and maintains the measurement protocol(s) of the devices (block 404), because the locally sensed data and the received sensed data are not highly correlated. If the example data comparator 202 determines that the comparison results satisfies the match threshold (block 402: YES), the example interface 200 transmits a match request to the device corresponding to the comparison (e.g., the device that measured the received data) (block 406). The example interface 200 transmits a match request to verify that the other device is capable of adjusting its measurement protocol. For example, the other device may have received restrictions on its measurement protocol, may not have the capabilities to adjust its protocol, and/or may already be matched with another device in the topology. In some examples, if the device is already matched with another device, the interface 200 may request data from the already matched devices to determine if the three devices are all correlated above the match threshold, to perform a three device measurement protocol adjustment (e.g., to match the three devices together).

At block 408, the example interface 200 receives a match response from the device that received the request. The match response may include the capability of the device, measurement protocol restrictions, the current measurement protocol being used by the device, etc. At block 410, the example operation adjuster 206 adjusts a measurement protocol based on the response and/or the comparison result. The example operation adjuster 206 may adjust the measurement protocol of the itself and/or the responding device. For example, if the responding device is not capable of adjusting its measurement protocol, the example operation adjuster 206 may adjust the local measurement protocol of the example device 100D. In some examples, the example operation adjuster 206 adjusts the one or more measurement protocols based on the amount of correlation. For example, a more aggressive adjustment to a measurement protocol (e.g., decreasing the sampling frequency and/or data transmission frequency by a large amount) may be used when the correlation is above 95% and a less aggressive adjustment to a measurement protocol may be used when the correlation is between 85% and 95%. Alternatively, any number of adjustments may be used for any number of different correlations.

At block 412, the example interface 200 transmits the adjusted measurement protocol to the corresponding device (e.g., the device corresponding to the comparison) and/or the example aggregator 108. In some examples, the example interface 200 may refrain from transmitting the adjusted measurement protocol to the corresponding device when the operation adjuster 206 is not adjusting the measurement protocol of the corresponding device. The example interface 200 may transmit the adjusted measurement protocol to the aggregator 108 (e.g., directly or via another device of the gateway 102) to provide additional information for the aggregator 108 to process. At block 414, the example protocol determiner 204 determines if the local measurement protocol has been adjusted (e.g., the measurement protocol utilized on the example device 100D). If the example protocol determiner 204 determines that the local measurement protocol has not been adjusted (block 414: NO), the process continues to block 418. If the example protocol determiner 204 determines that the local measurement protocol has been adjusted (block 414: YES), the example protocol determiner 204 executes the adjusted measurement protocol locally on the example device 100D (block 416).

At block 418, the example interface 200 determines if additional data has been received from a neighbor device in the topology (e.g., the example devices 100A-100C, 100E-100F). If the example interface 200 determines that additional data has not been received form a neighbor device in the topology (block 418: NO), the process returns to block 418 until additional data has been received. If the example interface 200 determines that additional data has been received form a neighbor device in the topology (block 418: YES), the process returns to block 304 of FIG. 3 to perform a subsequent comparison based on the newly received data.

Figure 5:
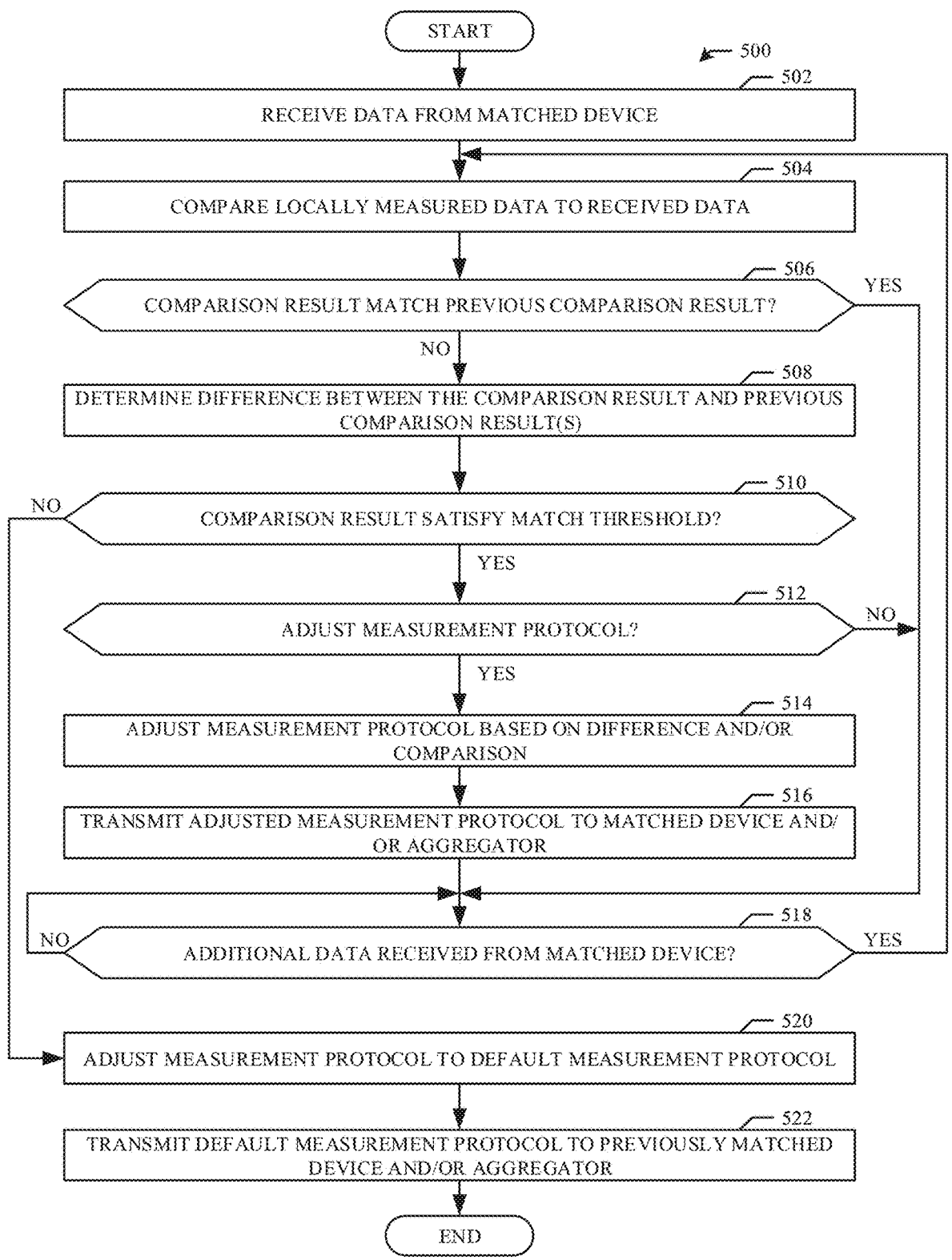

FIG. 5 is an example flowchart 500 representative of example machine readable instructions that may be executed by the example topology operation determiner 104D of FIG. 2 to dynamically control devices based on distributed data. The instructions of FIG. 5 correspond to when the device 100D is not a leader and the device 100D is already matched with another device in the topology (e.g., there is an adjusted measurement protocol based on the two matched devices). Although the instructions of flowchart 500 are described in conjunction with the example topology operation determiner 104D of the device 100D, the instructions may be executed by any of the topology operation determiners 104A-F of any of the devices 100A-F.

At block 502, the example interface 200 receives measurement data from a matched device (e.g., a device that previously had a comparison that satisfied a match threshold and at least one of the local device 100D and or the matched device is operating using an adjusted measurement protocol). At block 504, the example data comparator 202 compares the locally measured data with the received measured data. As described above, the comparison may be based on a cross-correlation, a time-delayed cross-correlation, and/or any type of probabilistic signal similarity function.

At block 506, the example data comparator 202 determines if the comparison result matches a previous comparison result between the two devices. If the example data comparator 202 determines that the comparison result matches the previous comparison result (block 506: YES), the measurement protocols are maintained and the process continues to block 818 (e.g., because there is no reason to adjust the measurement protocol(s) of the matched devices). If the example data comparator 202 determines that the comparison result does not match the previous comparison result (block 506: NO), the data comparator 202 determines a difference between the comparison result and the previous comparison result (block 508). In this manner, the example topology operation determiner 104D may determine whether the devices should still be matched and/or how to adjust the measurement protocol(s), if at all, based on the new comparison.

At block 510, the example data comparator 202 determines if the comparison result satisfies the match threshold. If the example data comparator 202 determines that the comparison result does not satisfy the match threshold (block 510: NO), the process continues to block 520. If the example data comparator 202 determines that the comparison result satisfies the match threshold (block 510: YES), the example operation adjuster 206 determines if the measurement protocol (e.g., of the local device 100D and/or the matched device) should be adjusted (block 512). The determination of whether the measurement protocol should be adjusted may be based on the new comparison (e.g., determined at block 504) and/or the difference between the comparison results and the previous comparison result(s) (e.g., determined at block 508). For example, if the previous correlation corresponds to a 98% correlation and the new correlation corresponds to an 89% correlation or the rate of change between two subsequent comparisons is high (e.g., more than a threshold rate of change), the operation adjuster 206 may determine that an aggressive measurement protocol adjustment may need to be adjusted to a less aggressive measurement protocol. However, if the difference between the previous correlation and the current correlation corresponds to a minor difference, the operation adjuster 206 may determine that there is no need for a measurement protocol adjustment.

If the example operation adjuster 206 determines that a measurement protocol (e.g., locally and/or at the matched device) does not need to be adjusted (block 512: NO), then the process continues to block 518. If the example operation adjuster 206 determines that a measurement protocol does need to be adjusted (block 512: YES), the example operation adjuster 206 adjusts the measurement protocol based on the different and/or the current comparison (e.g., to increase or decrease the sampling/transmission frequency) (block 514). At block 516, the example interface 200 transmits the adjusted measurement protocol to the matched device and/or the example aggregator 108 (e.g., via example the gateway 102). In some examples, the interface 200 only transmits the adjusted measurement protocol to the matched device when the measurement protocol of the matched device is being adjusted.

At block 518, the example interface 200 determines if additional data has been received from the matched device. If the example interface 200 determines that additional data has not been received from the matched device (block 518: NO), the process returns to block 518 until additional data has been received. If the example interface 200 determines that additional data has been received from the matched device (block 518: YES), the process returns to block 504 to perform a subsequent comparison.

If the example data comparator 202 determines that the comparison result does not satisfy the match threshold (block 510: NO), the operation adjuster 206 adjusts the measurement protocol (e.g., of the local device 100B and/or the previously matched device) back to the default measurement protocol (block 520), thereby unmatching the previously matched devices. At block 522, the example interface 200 transmits the default measurement protocol to the previously matched device and/or the aggregator 108 (e.g., directly or via the gateway 102).

Figure 6:
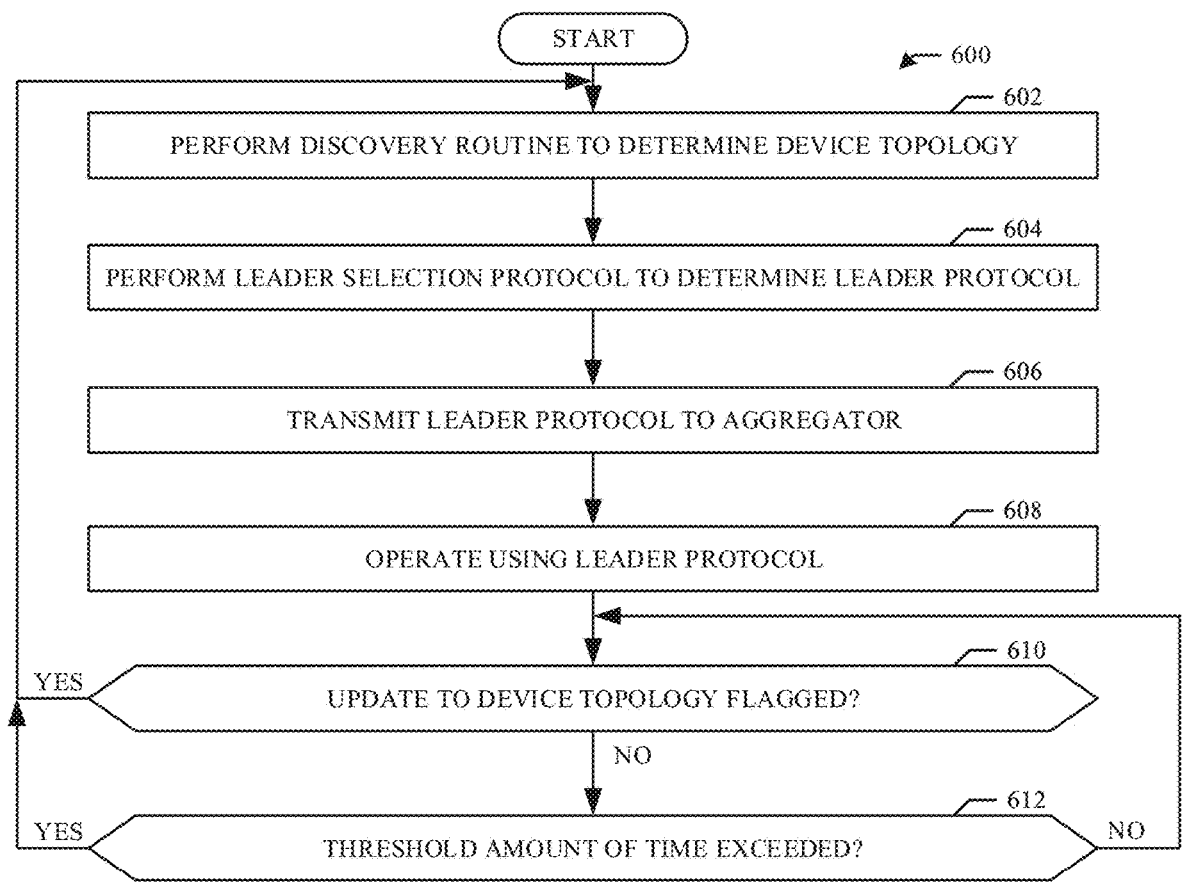

FIG. 6 is an example flowchart 600 representative of example machine readable instructions that may be executed by the example topology operation determiner 104D of FIG. 2 to initiate a leader selection protocol in a leader-based topology. Although the instructions of flowchart 600 are described in conjunction with the example topology operation determiner 104D of the device 100D, the instructions may be executed by any of the topology operation determiners 104A-F of any of the devices 100A-F and/or the topology operation determiner 104G of the example gateway 102.

At block 602, the example protocol determiner 204 performs a discovery routine to determine a device topology. The discovery routine may transmit/receive advertisements from other devices (e.g., the example devices 100A-100C, 100E-F) within range of the device 100D. The discovery routine may include transmitting connected devices to each device 100A-F in the topology so that each device 100A-F is aware of the full device topology. At block 604, the example protocol determiner 204 performs a leader selection protocol to determine the leader protocol. The leader selection protocol includes each device in the topology transmitting information between the other devices in the topology. In this manner, the protocol determiners 204 of the devices in the topology can negotiate a leader protocol based on the shared information. For example, the protocol determiners 204 may determine the leader protocol based on the residual energies of the devices, the location of the devices, the bandwidth of the devices, etc. As described above, the leader protocol corresponds to which device should operate as a leader during a given sampling interval.

At block 606, the example interface 200 transmits the leader protocol to the example aggregator 108 (e.g., directly or via the example gateway 102). In this manner, the example aggregator 108 can process one or more leader protocols that have been executed by the topology to provide a user with information regarding device use in the topology. For example, if the aggregator 108 has received multiple leader protocols where the example device 100D is the leader for a majority of the cycles, the aggregator 108 may provide such information to a user to allow the user to upgrade the hardware of the device 100D and/or deploy more devices near the device 100D to share the load. In some examples, the aggregator 108 may flag a device that frequently operates as a leader. In this manner, the topology operation determiners 104A-F of the example devices 100A-F may attempt to adjust the measurement protocol of the flagged device when the flagged device is not a leader and is matched with one or more devices within the topology, thereby conserving resources when not operating as the leader.

At block 608, the example protocol determiner 204 ensures that the example topology operation determiner 104D operates using the leader protocol. For example, if the leader protocol corresponds to operating as a leader for one minute followed by two minutes of non-leader operation, then the example protocol determiner 204 ensures that the example protocol determiner 204 ensures that such a leader protocol is executed. At block 610, the example interface 200 determiners if an update to the device topology has been flagged. An updated may be flagged by any of the devices in the topology when such device determines that a previously connected device has left the topology (e.g., when expected data from the device is no longer being received) or when such device receives an advertisement for a new device attempting to access the topology. When the device flags an update, the device transmits the flag (e.g., directly or indirectly) to the leader and/or the other devices within the topology to initiate a leader selection protocol to determine a new leader protocol based on the updated topology.

If the example interface 200 determines that an update to the device topology has been flagged (block 610: YES), the process returns to block 602 to perform a subsequent leader selection protocol. If the example interface 200 determines that an update to the device topology has not been flagged (block 610: NO), the example timer 208 determines if a threshold amount of time has exceeded (block 612). In this manner, a subsequent leader selection protocol may occur periodically or aperiodically to ensure that the leader protocol is always up-to-date (e.g., optimal based on the topology configuration). If the example timer 208 determines that the threshold amount of time has not been exceeded (block 612: NO), the process returns to block 610 until an update is flagged or the threshold amount of time exceeds. If the example timer 208 determines that the threshold amount of time has exceeded (block 612: YES), the process returns to block 602 to perform a subsequent leader selection protocol.

Figure 7:
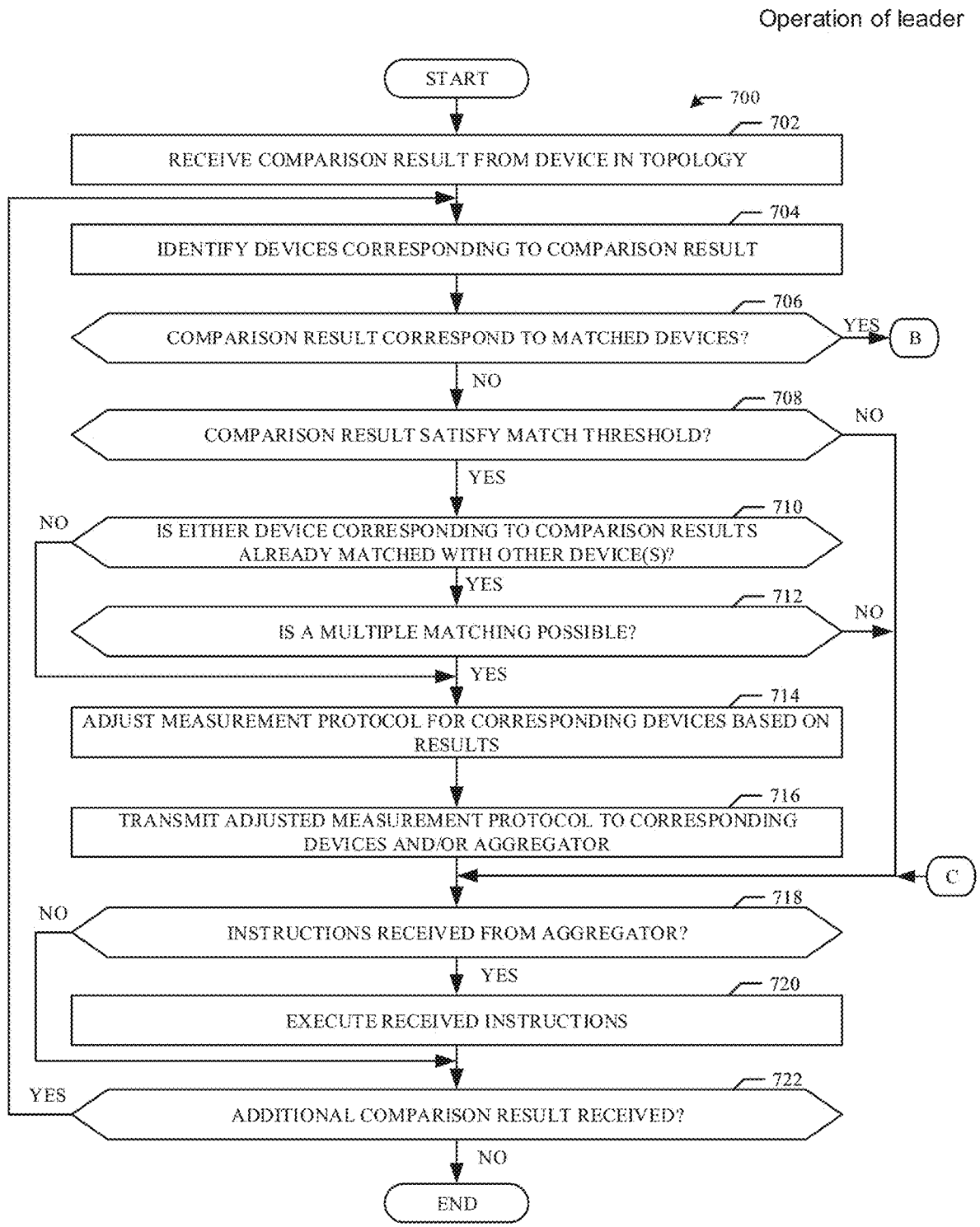

FIG. 7 is an example flowchart 700 representative of example machine readable instructions that may be executed by the example topology operation determiner 104D of FIG. 2 to dynamically control devices based on distributed data. The instructions of FIG. 7 correspond to when the device 100D is a leader. Although the instructions of flowchart 700 are described in conjunction with the example topology operation determiner 104D of the device 100D, the instructions may be executed by any of the topology operation determiners 104A-F of any of the devices 100A-F and/or the topology operation determiner 104G of the example gateway 102.

At block 702, the example receives a comparison result from a device (e.g., a neighbor device 100B-100C, 100D-100E) in the topology. The comparison result corresponds to a comparison between the measured data of two or more of the devices in the topology. The comparison result may include data related to the comparison including, for example, an identifier of the devices corresponding to the comparison, the comparison function used, a timestamp of the comparison, etc. The comparison results may correspond to a comparison of any of the devices in the topology.

At block 704, the example data comparator 202 identifies the devices based on the comparison result (e.g., which may be identified by processing the comparison result). At block 706, the example data comparator 202 determines if the comparison result corresponds to already matched devices. If the example data comparator 202 determines that the comparison result corresponds to already matched devices (block 706: YES), the process continues to FIG. 7 (e.g., block 'B'). If the example data comparator 202 determines that the comparison result does not correspond to already matched devices (block 706: NO), the example data comparator 202 determines if the comparison result satisfies a match threshold (block 708). If the example data comparator 202 determines that the comparison result does not satisfy the match threshold (block 708: NO), the measurement protocol of the devices is maintained, and the process continues to block 718. If the example data comparator 202 determines that the comparison result does satisfy the match threshold (block 708: YES), the data comparator 202 determines if either device corresponding to the comparison results is already matched with another device(s) (block 710).

If the example data comparator 202 determines that either device corresponding to the comparison results is not already matched with another device(s) (block 710: NO), the process continues to block 714. If the example data comparator 202 determines that either device corresponding to the comparison results is already matched with another device(s) (block 710: YES), the data comparator 202 determines if a multiple (e.g., three-way, four-way, etc.) matching is possible. For example, the data comparator 202 may facilitate a negotiation between the multiple devices to determine whether a comparison of the measured data between the three or more devices satisfies the match threshold. If the example data comparator 202 determines that multiple matching is not possible (block 712: NO), the process continues to block 718. If the example data comparator 202 determines that multiple matching is possible (block 712: YES), the example operation adjuster 206 adjusts the measurement protocol(s) for the corresponding devices based on the comparison results (block 714). For example, the operation adjuster 206 may adjust the measurement protocol to decrease the sampling/transmission frequency of one of the matched devices. In some examples, the operation adjuster 206 adjusts the measurement protocol (s) based on the comparison (e.g., by adjusting higher correlated devices more aggressively and adjusting lesser correlated devices less aggressively).

At block 716, the example interface 200 transmits the adjusted measurement protocol to the corresponding devices and/or the example aggregator 108. In this manner, the corresponding devices can operate using the adjusted measurement protocol and the aggregator 108 can process the adjusted measurement protocol to determine topology patterns. At block 718, the example interface 200 determines if instructions from the example aggregator 108 have been received (e.g., directly or indirectly). The example aggregator 108 may transmit instructions to the leader (e.g., the example device 100D) to make measurement protocol and/ or leader protocol adjustments based on the data that the aggregator 108 has received and/or based on user instruction. For example, the aggregator 108 may transmit instructions to adjust the comparison function used by the topology operation determiners 102A-102F, adjust the leader protocol to reduce/increase the amount of time that one or more devices 100A-100F operates as the leader, place restrictions on one or more of the example device 100A-100F, etc.

If the example interface 200 determines that instructions from the example aggregator 108 have not been received (block 718: NO), the process continues to block 722. If the example interface 200 determines that the instructions from the aggregator 108 have been received (block 718: YES), the example topology operation determiner 104D executes the received instructions (block 720). At block 722, the example interface 200 determines if an additional comparison result has been received. If the example interface determines that an additional comparison result has not been received (block 722: NO), the process returns to block 718 until instructions have been received from the example aggregator 108 or an additional comparison result has been received. If the example interface determines that an additional comparison result has been received (block 722: YES), the process returns to block 704 to process the subsequent comparison result.

Figure 8:
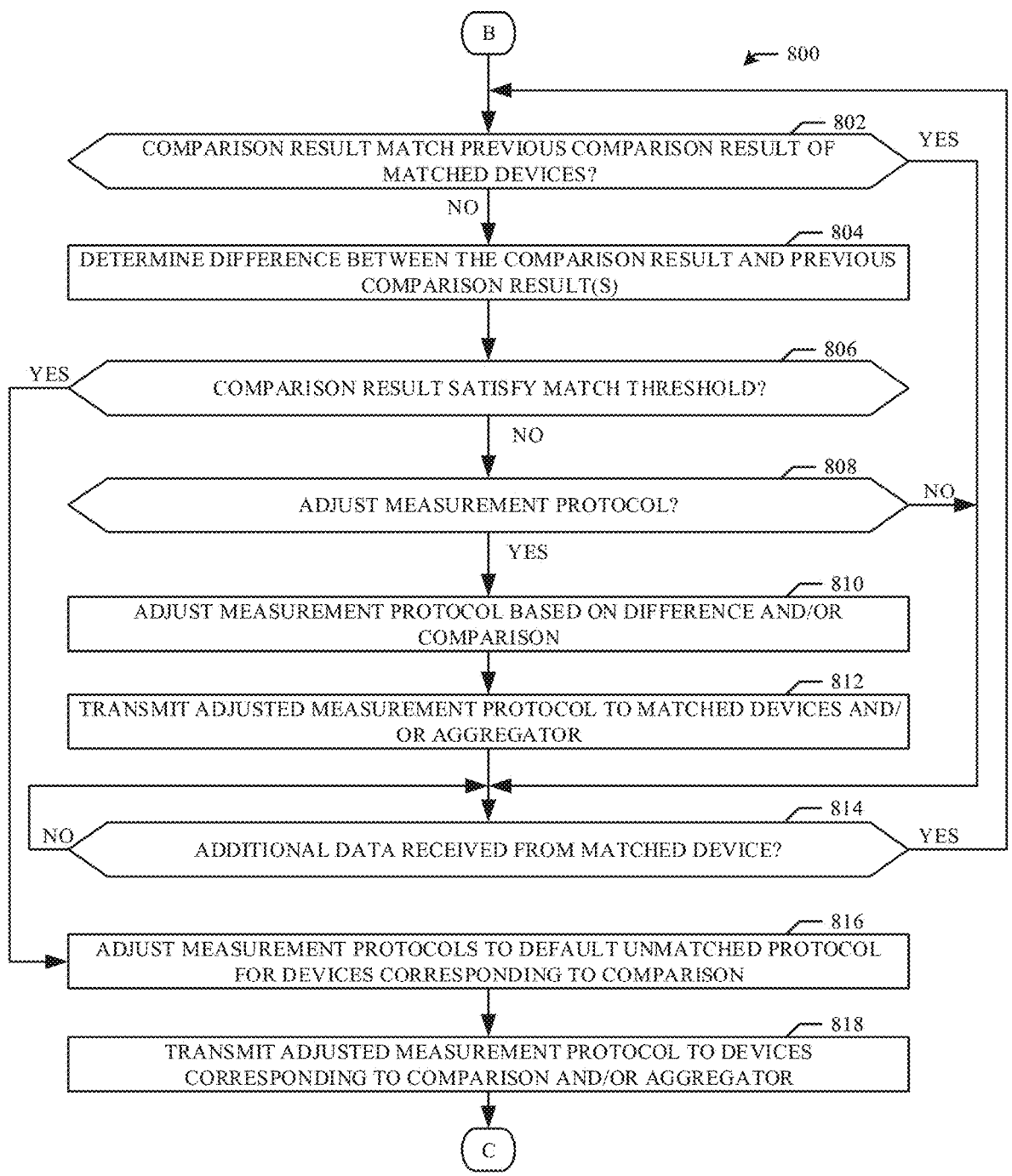

FIG. 8 is an example flowchart 900 representative of example machine readable instructions that may be executed by the example topology operation determiner 104D of FIG. 2 to dynamically control devices based on distributed data when a received comparison result corresponds to already matched devices, as described above in conjunction with block 706. The instructions of FIG. 8 correspond to when the device 100D is a leader. Although the instructions of flowchart 800 are described in conjunction with the example topology operation determiner 104D of the device 100D, the instructions may be executed by any of the topology operation determiners 104A-F of any of the devices 100A-F and/or the topology operation determiner 104G of the example gateway 102.

At block 802, the example data comparator 202 determines if the comparison result matches a previous comparison result between the two devices. If the example data comparator 202 determines that the comparison result matches the previous comparison result (block 802: YES), the operation adjuster 206 maintains the measurement protocol(s) and the process continues to block 814 (e.g., because there is no reason to adjust the measurement protocol(s) of the matched devices). If the example data comparator 202 determines that the comparison result does not match the previous comparison result (block 802: NO), the data comparator 202 determines a difference between the comparison result and the previous comparison result (block 804). In this manner, the example topology operation determiner 104D may determine whether the devices should still be matched and/or how to adjust the measurement protocol(s), if at all, based on the new comparison.

At block 806, the example data comparator 202 determines if the comparison result satisfies the match threshold. If the example data comparator 202 determines that the comparison result does not satisfy the match threshold (block 806: NO), the process continues to block 814. If the example data comparator 202 determines that the comparison result satisfies the match threshold (block 806: YES), the example operation adjuster 206 determines if the measurement protocol (e.g., of the local device 100D and/or the matched device) should be adjusted (block 808). The determination of whether the measurement protocol should be adjusted may be based on the comparison and/or the difference between the comparison results and the previous comparison result(s) (e.g., determined at block 804). For example, if the previous correlation corresponds to a 98% correlation and the new correlation corresponds to an 89% correlation or the rate of change between two subsequent comparisons is high (e.g., more than a threshold rate of change), the operation adjuster 206 may determine that an aggressive measurement protocol adjustment may need to be adjusted to a less aggressive measurement protocol. However, if the difference between the previous correlation and the current correlation corresponds to a minor difference, the operation adjuster 206 may determine that there is no need for a measurement protocol adjustment.

If the example operation adjuster 206 determines that a measurement protocol (e.g., locally and/or at the matched device) does not need to be adjusted (block 808: NO), the operation adjuster 206 maintains the measurement protocol(s) and the process continues to block 814. If the example operation adjuster 206 determines that a measurement protocol does need to be adjusted (block 808: YES), the example operation adjuster 206 adjusts the measurement protocol based on the different and/or the current comparison (e.g., to increase or decrease the sampling/transmission frequency) (block 810). At block 812, the example interface 200 transmits the adjusted measurement protocol to the matched device and/or the example aggregator 108 (e.g., via the example the gateway 102). In some examples, the interface 200 only transmits the adjusted measurement protocol to the matched device when the measurement protocol of the matched device is being adjusted.

At block 814, the example interface 200 determines if additional data has been received from the matched device. If the example interface 200 determines that additional data has not been received from the matched device (block 814: NO), the process returns to block 814 until additional data has been received. If the example interface 200 determines that additional data has been received from the matched device (block 814: YES), the process returns to block 802 to perform a subsequent comparison.

If the example data comparator 202 determines that the comparison result does not satisfy the match threshold (block 806: NO), the operation adjuster 206 adjusts the measurement protocol (e.g., of the local device 100B and/or the previously matched device) back to the default measurement protocol (block 816), thereby unmatching the previously matched devices. At block 818, the example interface 200 transmits the default measurement protocol to the previously matched device and/or the aggregator 108 (e.g., directly or via the gateway 102).

Figure 9:
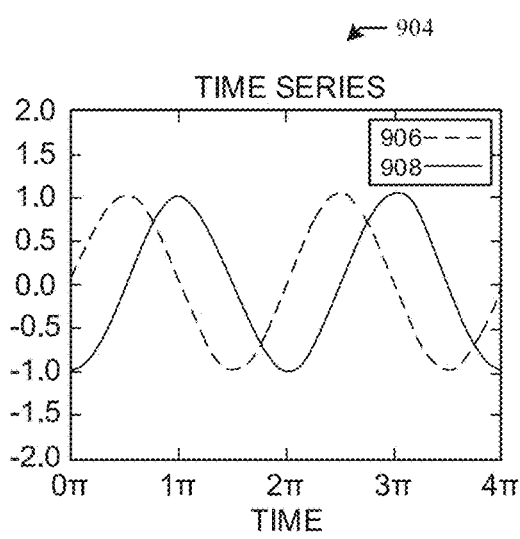
FIG. 9 illustrated a time-delayed event in an example distributed network of example devices.
Figure 9:
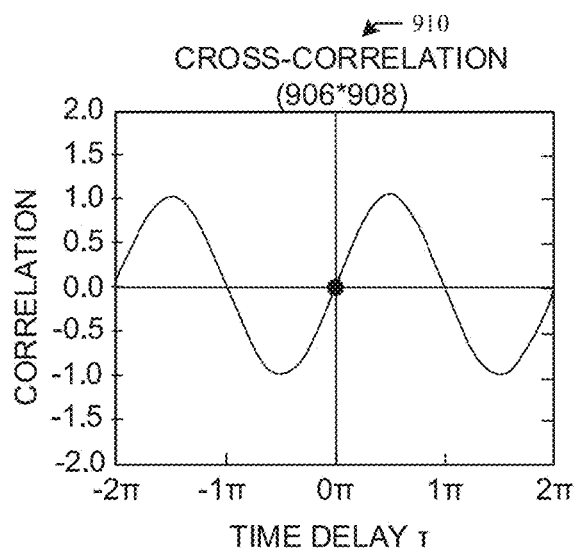

FIG. 9 illustrates an example device topology 900 that is undergoing an event (event 'E') at different points in time. For example, event E may correspond to a change in temperature resulting in a wind gust, where the change in temperature is identified by the different devices at different points in time. The example topology 900 includes example devices 902A-902P. FIG. 9 further includes a time series model 904 including first example measurement data 906 corresponding to measurement data of the first example device 902A and second example measurement data 908 corresponding to measurement data of the second example device 902B. FIG. 9 further includes a cross correlation model 910 corresponding to the time-delayed cross-correlation between the first measurement data 906 and the second measurement data 908.

At shown in the example device topology 900, event E can be identified at each of the example devices 902A-P at different points in time. For example, the measurement data of the first device 902A corresponds to event E at time T0, the measurement data of the second, third, and fourth devices 902B-902D corresponds to event E at time T1, etc. Accordingly, if the example topology operation determiner of the second device 902B compares the first measurement data 906 of the first device 902A at time T0 with the second measurement data 908 of the second device 902B, at time T0 (e.g., without time-delay), there will be zero correlation, as shown in the example cross-correlation model 910. However, if the example topology operation determiner of the second device 902B compares the first measurement data 906 of the first device 902A at time T0 with the second measurement data 908 of the second device 902B at time T1 (e.g., with a time delay of $\pi/2$), there will be a high correlation, as shown in the example cross-correlation model 910. Accordingly, the example topology operation determiner of a device may perform a cross-correlation and time-delayed cross-correlation(s) to compare received measurement data with locally measured data. In this manner, the topology operation determiner of the device may adjust a measurement protocol based on the cross-correlation and/or the time-delayed cross-correlation(s).

Figure 10:
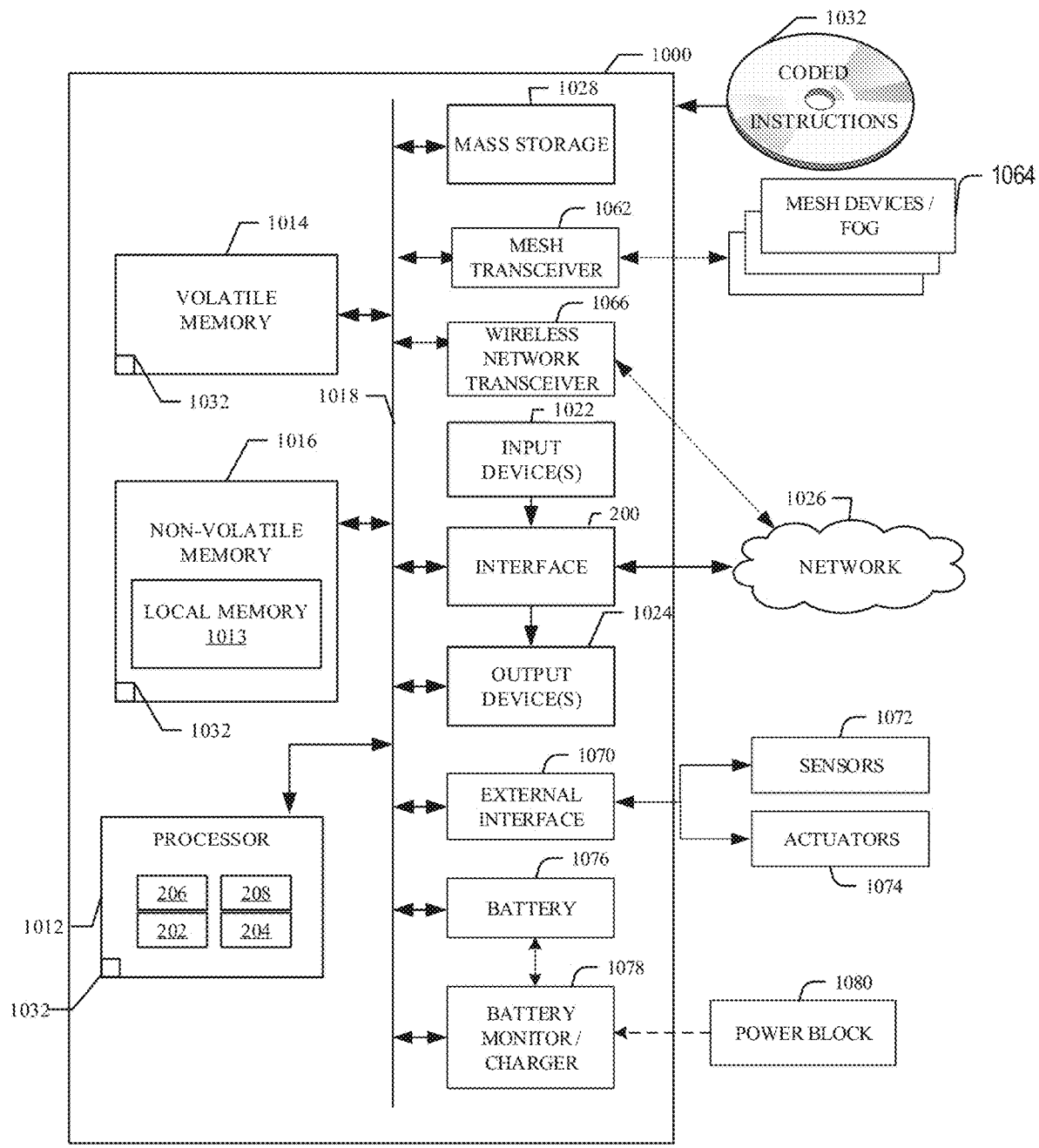
FIG. 10 is a block diagram of an example processing platform structured to execute the instructions of FIGS. 3-8 to implement the example topology operation determiner of FIGS. 1-2.

FIG. 10 is a block diagram of an example of components that may be present in the example devices 100A-F. For example, FIG. 10 may be an example processor platform 1000 structured to execute the instructions of FIGS. 3-8 to implement the topology operation determiner 104D of FIG. 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example interface 200, the example data comparator 202, the example protocol determiner 204, the example operation adjuster 206, and/or the example timer 208 of FIG. 2.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 200. The interface circuit 200 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, a sensor, a microphone, a camera (still or video), a touchscreen, and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 3-8 may be stored in the mass storage device 1028, in the volatile memory 1014, in the non-volatile memory 1016, and/or on a removable non-transitory computer readable storage medium such as a CD or DVD.

The mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the network 1026 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

The external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the device 100A-F to actuators 1074, such as power switches, valve actuators, an audible sound generator, a visual warning device, and the like.

The battery 1076 may power the device 100A-F, although in examples in which the device 100A-F is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

The battery monitor/charger 1078 may be included in the device 100A-F to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1078 may communicate the information on the battery 1076 to the processor 1012 over the interconnect 1056. The battery monitor/charger 1078 may also include an analog-to-digital (ADC) convertor that allows the processor 1012 to directly monitor the voltage of the battery 1076 or the current flow from the battery 1076. The battery parameters may be used to determine actions that the device 100A-F may perform, such as transmission frequency, mesh network operation, sensing frequency, and the like.

The power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the device 100A-F. A wireless battery charging circuit, such as an LTC4020 chip from Linear Technologies of Milpitas, California, among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Example 1 includes an apparatus comprising a comparator to compare a first measurement measured by a first peer device to a second measurement, the second measurement being measured locally by the apparatus, and an operation adjuster to, when the comparison satisfies a threshold, adjust a measurement protocol of the first peer device.

Example 2 includes the apparatus of example 1, wherein the comparator is to compare the first measurement to the second measurement by performing at least one of a cross-correlation or a time-delayed cross correlation.

Example 3 includes the apparatus of example 1, wherein the operation adjuster is to adjust the measurement protocol of the first peer device by at least one of decreasing a sampling frequency of the first peer device or decreasing a measurement transmission frequency of the first peer device.

Example 4 includes the apparatus of example 1, wherein the comparator is to compare a third measurement from the first peer device to a fourth measurement, the fourth measurement being measured locally at the apparatus, and the operation adjuster is to if the comparison of the third measurement to the fourth measurement satisfies the threshold, maintain the adjusted measurement protocol of the first peer device, and if the comparison of the third measurement to the fourth measurement does not satisfy the threshold, return the measurement protocol of the first peer device back to a default measurement protocol.

Example 5 includes the apparatus of example 1, wherein the operation adjuster is to adjust the measurement protocol by a first amount when the comparison corresponds to a first level and adjust the measurement protocol by a second amount when the comparison corresponds to a second level.

Example 6 includes the apparatus of example 1, wherein the operation adjuster is to adjust the measurement protocol of the first peer device by transmitting a command to the first peer device to adjust the measurement protocol.

Example 7 includes the apparatus of examples 1, wherein the apparatus and the first peer device are sensors.

Example 8 includes an apparatus comprising a comparator to determine if a comparison satisfies a threshold, the comparison corresponding to a comparison of a first measurement by a first device and a second measurement by a second device, an operation adjuster to, when the comparison satisfies the threshold, adjust a measurement protocol of at least one of the first device or the second device, and an interface to transmit the adjusted measurement protocol to at least one of the first device or the second device.

Example 9 includes the apparatus of example 7, wherein the comparison corresponds to at least one of a cross-correlation or a time-delayed cross correlation.

Example 10 includes the apparatus of example 7, wherein the operation adjuster is to adjust the measurement protocol by at least one of decreasing a sampling frequency of at least one of the first device or the second device or decreasing a measurement transmission frequency of at least one of the first device or the second device.

Example 11 includes the apparatus of example 7, wherein the operation adjuster is to, when the comparison does not satisfy the threshold, maintain the measurement protocols of the first and second devices.

Example 12 includes the apparatus of example 7, wherein the comparator is to determine if a subsequent comparison satisfies the threshold, the subsequent comparison corresponding to a subsequent comparison of a third measurement by the first device and a fourth measurement by the second device, the subsequent comparison occurring after the comparison, and the operation adjuster is to, when the subsequent comparison does not satisfy the threshold, adjust the measurement protocol of at least one of the first device or the second device to a default measurement protocol.

Example 13 includes the apparatus of example 7, wherein the comparison was performed by at least one of the first device or the second device.

Example 14 includes the apparatus of example 7, wherein the comparator is to perform the comparison.

Example 15 includes the apparatus of claim 7, wherein adjusting the measurement protocol reduces the cost function of a network of devices.

Example 16 includes a non-transitory computer readable storage medium comprising instructions which, when executed, cause a machine to at least perform a measurement locally at a first sensor, compare a received measurement measured by an external sensor to the measurement at the first sensor, the received measurement being transmitted by the external sensor to be forwarded to a gateway; when the comparison satisfies a threshold, adjust a measurement protocol of the external sensor based on the comparison; and transmit the adjusted measurement protocol of the external sensor.

Example 17 includes the computer readable storage medium of example 15, wherein the instructions cause the machine to compare the received measurement to the measurement by executing at least one of a cross-correlation function or a time-delayed cross correlation function.

Example 18 includes the computer readable storage medium of example 15, wherein the instructions cause the machine to adjust the measurement protocol of the external sensor by at least one of decreasing a sampling frequency of the external sensor or decreasing a measurement transmission frequency of the external sensor.

Example 19 includes the computer readable storage medium of example 15, wherein the measurement is a first measurement and the received measurement is a first received measurement, the instructions causing the machine to perform a second measurement locally at the first sensor, the second measurement occurring after the first measurement, compare a second received measurement from the external sensor to the second measurement, the second received measurement being received after the first received measurement, and if the comparison of the second received measurement to the second measurement does not satisfy the threshold, adjust the measurement protocol of the external sensor to a default measurement protocol.

Example 20 includes the computer readable storage medium of example 5, wherein the instructions cause the machine to adjust the measurement protocol by a first amount when the comparison corresponds to a first level and adjust the measurement protocol by a second amount when the comparison corresponds to a second level.

Example 21 includes the computer readable storage medium of example 15, wherein the instructions cause the machine to adjust the measurement protocol of the external sensor by transmitting a command to the external sensor to adjust the measurement protocol.

Example 22 includes a non-transitory computer readable storage medium comprising instructions which, when executed, cause a machine to at least determine if a comparison satisfies a threshold, the comparison corresponding to a comparison of a first measurement measured at a first device and a second measurement measured at a second device, when the comparison satisfies the threshold, adjust a measurement protocol of at least one of the first device or the second device, and transmit the adjusted measurement protocol to at least one of the first device or the second device.

Example 23 includes the computer readable storage medium of example 21, wherein the comparison corresponds to at least one of a cross-correlation or a time-delayed cross correlation.

Example 24 includes the computer readable storage medium of example 1, wherein the instructions cause the machine to adjust the measurement protocol by at least one of decreasing a sampling frequency of at least one of the first device or the second device or decreasing a measurement transmission frequency of at least one of the first device or the second device.

Example 25 includes the computer readable storage medium of example 21, wherein the instructions cause the machine to, when the comparison does not satisfy the threshold, discard the comparison.

Example 26 includes the computer readable storage medium of example 21, wherein the instructions cause the machine to determine if a subsequent comparison satisfies the threshold, the subsequent comparison corresponding to a subsequent comparison of a third measurement by the first device and a fourth measurement by the second device, the subsequent comparison occurring after the comparison, and when the subsequent comparison does not satisfy the threshold, adjust the measurement protocol of at least one of the first device or the second device to a default measurement protocol.

Example 27 includes the computer readable storage medium of example 20, wherein the comparison was performed locally or by at least one of the first device or the second device.

From the foregoing, it will be appreciated that example methods, apparatus and articles of manufacture have been disclosed that dynamically control devices based on distributed data. Examples disclosed herein include comparing locally measured data with received measured data to determine if the received data is correlated with the measured data. If the received data of a first device is correlated with the locally measured data of a second device, examples disclosed herein reduce the sampling frequency of the first or second device. Using examples disclosed herein, processor resources are reduced by eliminating largely repetitive and/or duplicative data while maintaining highly granular monitoring of a location. In this manner, a cost function of a network of devices is reduced (total resources and/or power to operate all devices in the network of device). Additionally, using examples disclosed herein, processing resources of the first or second device are conserved by reducing the number of times that the first or second device needs to perform a measurement.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A first device comprising:
interface circuitry;
instructions; and
at least one processor circuit to be programmed by the instructions to:

negotiate with one or more other devices of a plurality of devices in a network to cause the first device to become a leader of the plurality of devices during a sampling interval;

after the first device becomes the leader, instruct a second device of the plurality of devices to decrease a data transmission rate based on comparison of second measurement data obtained based on a sensor of the second device to first measurement data obtained based on a sensor of the first device, the data transmission rate associated with communication from the second device to the first device; and detect a change to a topology of the network to cause renegotiation, the renegotiation to cause at least one of i) the first device to remain the leader, or ii) at least one of the one or more other devices of the plurality of devices to operate as the leader.

2. The first device of claim 1, wherein one or more of the at least one processor circuit is to execute a discovery routine to determine the topology of the network, execution of the discovery routine to cause the one or more of the at least one processor circuit to:

at least one of (a) cause transmission of a first advertisement to the one or more other devices of the plurality of devices or (b) process respective advertisements from the one or more other devices of the plurality of devices; and in response to determining the topology of the network, cause transmission of the topology to at least one of the one or more other devices of the plurality of devices in the network.

3. The first device of claim 1, wherein one or more of the at least one processor circuit is to negotiate with the one or more other devices of the plurality of devices based on at least one of (a) respective residual energies of the plurality of devices, (b) respective locations of the plurality of devices, or (c) respective bandwidths of the plurality of devices.

4. The first device of claim 1, wherein one or more of the at least one processor circuit is to cause transmission of an indication of a leader protocol to an aggregator, the aggregator to track ones of the plurality of devices that operated as leaders of the plurality of devices during different sampling intervals.

5. The first device of claim 4, wherein the ones of the plurality of devices that operated as the leaders of the plurality of devices during different sampling intervals include a third device different from the first device.

6. The first device of claim 1, wherein one or more of the at least one processor circuit is to detect the change to the topology of the network as an advertisement from a new device attempting to access the network.

7. The first device of claim 1, wherein one or more of the at least one processor circuit is to detect the change to the topology of the network in response to an absence of data expected to be received from one of the one or more other devices of the plurality of devices.

8. The first device of claim 1, wherein one or more of the at least one processor circuit is to, in response to determining that a threshold amount of time has passed, cause renegotiation with the one or more other devices of the plurality of devices to determine whether one of the one or more other devices of the plurality of devices is to operate as the leader.

9. A non-transitory computer readable storage medium comprising instructions to cause at least one processor circuit of a first device to at least:

discover a topology of a plurality of devices in a network, the plurality of devices including the first device;

negotiate with one or more other devices of the plurality of devices to determine a leader protocol, the leader protocol to cause the first device to become a leader of the plurality of devices during a sampling interval;

after the first device becomes the leader, instruct a second device of the plurality of devices to decrease a data transmission rate based on comparison of second measurement data obtained based on a sensor of the second device to first measurement data obtained based on a sensor of the first device, the data transmission rate associated with communication from the second device to the first device; and detect a change to the topology of the plurality of devices in the network to cause renegotiation of the leader protocol.

10. The non-transitory computer readable storage medium of claim 9, wherein to discover the topology, the instructions are to cause one or more of the at least one processor circuit to:

at least one of (a) cause transmission of a first advertisement to the one or more other devices of the plurality of devices or (b) process respective advertisements received from the one or more other devices of the plurality of devices; and in response to determining the topology of the one or more other devices of the plurality of devices in the network, cause transmission of the topology to the plurality of devices in the network.

11. The non-transitory computer readable storage medium of claim 9, wherein the instructions are to cause one or more of the at least one processor circuit to negotiate with the one or more other devices of the plurality of devices based on at least one of (a) respective residual energies of the plurality of devices, (b) respective locations of the plurality of devices, or (c) respective bandwidths of the plurality of devices.

12. The non-transitory computer readable storage medium of claim 9, wherein the instructions are to cause one or more of the at least one processor circuit to cause transmission of an indication of the leader protocol to an aggregator, the aggregator to track ones of the plurality of devices that operated as leaders of the plurality of devices during different sampling intervals.

13. The non-transitory computer readable storage medium of claim 12, wherein the ones of the plurality of devices that operated as the leaders of the plurality of devices during different sampling intervals include a third device different from the first device.

14. The non-transitory computer readable storage medium of claim 9, wherein the instructions are to cause one or more of the at least one processor circuit to detect the change to the topology of the ones of the plurality of devices in the network as an advertisement from a new device attempting to access the network.

15. The non-transitory computer readable storage medium of claim 9, wherein the instructions are to cause one or more of the at least one processor circuit to detect the change to the topology of the one or more other devices of the plurality of devices in the network in response to an absence of data from one of the one or more other devices of the plurality of devices.

16. The non-transitory computer readable storage medium of claim 9, wherein the instructions are to cause one or more of the at least one processor circuit to, in response to determining that a threshold amount of time has passed, cause renegotiation with the one or more other devices of the plurality of devices to determine the leader protocol.

17. At least one non-transitory computer readable medium comprising instructions to cause at least one processor circuit to at least:
   negotiate to cause a first device to become a leader among a plurality of devices including a second device;
   compare first data obtained based on a sensor of the first device and second data obtained based on a sensor of the second device to determine a correlation between the first device and the second device; and
   instruct the second device to reduce a data transmission rate of the second device based on the correlation, the data transmission rate associated with communication from the second device to the first device.

18. The at least one non-transitory computer readable medium of claim 17, wherein the instructions are to cause one or more of the at least one processor circuit to renegotiate to cause at least one of i) the first device to remain the leader, or ii) at least one of the second device or another device to become the leader.

19. The at least one non-transitory computer readable medium of claim 17, wherein the instructions are to cause one or more of the at least one processor circuit to instruct the second device to decrease a measurement sampling frequency of the second device based on the correlation.

20. The at least one non-transitory computer readable medium of claim 19, wherein the instructions are to cause one or more of the at least one processor circuit to instruct the second device to decrease the measurement sampling frequency of the second device in response to the correlation satisfying a threshold.

21. The at least one non-transitory computer readable medium of claim 17, wherein the instructions are to cause one or more of the at least one processor circuit to reduce the data transmission rate of the second device in response to the correlation satisfying a threshold.

22. The at least one non-transitory computer readable medium of claim 17, wherein the instructions are to cause one or more of the at least one processor circuit to instruct the second device to return the data transmission rate of the second device to a default data transmission rate after a threshold duration of time.

23. The at least one non-transitory computer readable medium of claim 17, wherein the at least one processor circuit is included in the first device.

24. The at least one non-transitory computer readable medium of claim 17, wherein the first data includes first measurement data sensed at the first device, the second data includes second measurement data sensed at the second device, and the data transmission rate is associated with a measurement protocol implemented at the second device.

* * * * *